United States Patent
Stamatakis et al.

(10) Patent No.: US 9,714,844 B1
(45) Date of Patent: Jul. 25, 2017

(54) DEMAND/RESPONSE MECHANISM IN A WIRELESS SENSOR NETWORK

(71) Applicant: Senseware, Inc., McLean, VA (US)

(72) Inventors: Julien G. Stamatakis, Centreville, VA (US); Serene Al-Momen, Centreville, VA (US)

(73) Assignee: Senseware, Inc., Tysons, VA (US)

( * ) Notice: Subject to any disclaimer, the term of this patent is extended or adjusted under 35 U.S.C. 154(b) by 0 days.

(21) Appl. No.: 15/006,439

(22) Filed: Jan. 26, 2016

Related U.S. Application Data

(63) Continuation of application No. 14/710,766, filed on May 13, 2015, now Pat. No. 9,534,929.

(60) Provisional application No. 61/992,307, filed on May 13, 2014, provisional application No. 62/136,959, filed on Mar. 23, 2015.

(51) Int. Cl.
*G01D 4/00* (2006.01)
*H04W 4/00* (2009.01)
*F24F 11/00* (2006.01)
*B60H 1/00* (2006.01)

(52) U.S. Cl.
CPC ......... *G01D 4/002* (2013.01); *B60H 1/00842* (2013.01); *F24F 11/001* (2013.01); *H04W 4/005* (2013.01); *B60H 1/00735* (2013.01); *F24F 11/0001* (2013.01)

(58) Field of Classification Search
None
See application file for complete search history.

(56) References Cited

U.S. PATENT DOCUMENTS

| | | | |
|---|---|---|---|
| 7,379,981 B2 | 5/2008 | Elliott et al. | |
| 8,103,389 B2 | 1/2012 | Golden et al. | |
| 2005/0055223 A1 | 3/2005 | Khosla | |
| 2007/0103324 A1* | 5/2007 | Kosuge | E03F 7/00 340/618 |
| 2007/0211681 A1 | 9/2007 | Sun et al. | |
| 2011/0007665 A1 | 1/2011 | Dinur | |
| 2011/0040809 A1 | 2/2011 | Spanier | |
| 2011/0157366 A1* | 6/2011 | Padmanabh | H04N 7/15 348/159 |
| 2012/0062370 A1 | 3/2012 | Feldstein | |
| 2012/0161940 A1 | 6/2012 | Taylor | |
| 2013/0182905 A1* | 7/2013 | Myers | H04N 7/18 382/103 |
| 2013/0211557 A1 | 8/2013 | O'Brien | |
| 2014/0126581 A1 | 5/2014 | Wang | |
| 2014/0285309 A1* | 9/2014 | Weidman | G01S 17/023 340/1.1 |
| 2014/0359133 A1 | 12/2014 | Tian | |

(Continued)

OTHER PUBLICATIONS iSelect Adds New Portfolio Company: Bractlet, 2015.

(Continued)

*Primary Examiner* — Leon-Viet Nguyen

(57) ABSTRACT

A wireless sensor network at a monitored location can be configured to generate sensor channel(s) of data to assess operational conditions at the monitored location. Inputs based on the sensor channel(s) of data are provided to a host system for analysis of a demand to one or more resources at the monitored location. Response messages can be generated based on the demand analysis and transmitted to actuator(s) at the monitored location to effect an adjustment to the operational conditions.

14 Claims, 8 Drawing Sheets

(56) References Cited

U.S. PATENT DOCUMENTS

| | | |
|---|---|---|
| 2015/0029022 A1 | 1/2015 | Stebbins |
| 2015/0200544 A1 | 7/2015 | Kitaji |
| 2015/0316945 A1 | 11/2015 | Soya |
| 2016/0006264 A1 | 1/2016 | Alperin |
| 2016/0112518 A1 | 4/2016 | Haleem et al. |

OTHER PUBLICATIONS

Know—Bractlet.
Analyze—Bractlet.
Ensure—Bractlet.
Announcing Samsara: Internet connected sensors, May 18, 2015.
Samsara—Internet Connected Sensors.
Samsara—Features.
Samsara—Models.
Samsara—API.
Cloud Logger, 38 Zeros, 2015.
Smart Processing Starts at the Edge of the Network, B+B Smartworx, 2014.
Wireless Sensors and Output Devices, ConnectSense, 2015.
It's Time You Experienced Eclypse, Distech Controls, 2014.
Compact Sensor, Enlighted, 2015.
Energy Manager, Enlighted, 2015.
Gateway, Enlighted, 2015.
Enlighted Smart Sensor, 2015.
Manning, Lauren, "Wireless Infrastructure Provider Filament Closes $5m Series A, Shows Promise for Agtech Application," Aug. 21, 2015.
Intellastar, 2015.
Your Internet of Things, Monnit, 2014.
Monnit Industrial Wireless AC Current Meter, 2015.
$3^{rd}$ Generation Nest Learning Thermostat, 2015.
AcquiSuite+ Dtaa Acquisition Server, Obvius, LLC, Installation and Operation Manual, Model A8814, Jan. 11, 2014.
Application Note: ModHopper Makes Submetering Easy, Obvius, LLC, Mar. 29, 2012.
ModHopper—Wireless Modbus/Pulse Transceiver, Obvius, LLC, Installation and Operation, Model R9120 (Rev C), Dec. 11, 2012.
Atmel Corporation, 8-bit AVR Microcontroller with Low Power 2.4GHz Transceiver for ZigBee and IEEE 802.15.4, 2014.
Application Note, Atmel AT06482: Real Color ZLL LED Light Bulb with ATmega256RFR2—Software User's Guide, 2013.
Application Note, AT06412: Real Color ZLL LED Light Bulb with ATmega256RFR2—Hardware User Guide, 2014.
Exploring New Lighting Opportunities with ZigBee Light Link Webinar, May 16, 2012.
Point Six Wireless Wi-Fi Sensor Product Guide, 2015.
Eagle, Rainforest Automation, 2015.
Product Comparison Guide, SmartStruxture Lite solution and wireless devices for SmartStruxture solution, Schneider Electric, Mar. 12, 2015.
SmartStruxure Lite Solution, SEC Series, Smart Terminal Controller (SEC-TE), Schneider Electric, Aug. 1, 2013.
SmartStruxure Lite Solution, Schneider Electric, May 1, 2015.
SmartStruxture Lite Solution, Our open system approach to standards and protocols, Schneider Electric, Jul. 2, 2014.
Senseware, Mar. 25, 2014.
Product Data Sheet, SWS-DPC Wireless Pulse Counters, SpinWave Systems, Inc., 2007.
Product Data Sheet, SWC-TSTAT-3 Wireless Thermostat Controller, SpinWave Systems, Inc., 2012.
A3 Wireless Sensor Network, SpinWave Systems, Inc., 2007.
Veris Industries, 2015.
U.S. Appl. No. 62/025,640, entitled "Separation of Current Sensor and Voltage Sensor for True Power Measurement," filed Jul. 17, 2014.
Khamphanchai et al., Conceptual Architecture of Building Energy Management Open Source Software (BEMOSS), 5th IEEE PES Intelligent Smart Grid Technologies (ISGT) European Conference, Oct. 12-15, 2014.
Dolphin Core Description, EnOcean, Jul. 21, 2014.
Remote Management 2.0, EnOcean, Mar. 6, 2013.
EnOcean—The World of Energy Harvesting Wireless Technology, Feb. 2015.
Wireless Sensor Solutions for Home & Building Automation—The Successful Standard Uses Energy Harvesting, EnOcean, Aug. 10, 2007.
Metasys® System Product Bulletin, Code No. LIT-1201526, Release 7.0, Dec. 5, 2014.
Metasys® System Extended Architecture Wireless Network, Application Note, Oct. 24, 2006.
Metasys® System Field Equipment Controllers and Related Products, Product Bulletin, Code No. LIT-12011042, Software Release 5.0, Jun. 21, 2010.
ZFR1800 Series Wireless Field Bus System, Technical Bulletin, Code No. LIT-12011295, Software Release 10.1, Dec. 5, 2014.
Wireless Metasys® System Product Bulletin, Code No. LIT-12011244, Software Release 5.0, Jan. 4, 2010.
Environmental Index™—Balancing Efficiency with Comfort, Automated Logic Corporation, 2013.
Equipment Portal, Automated Logic Corporation, 2013.
EnergyReports™ Web Application—A Tool for Sustainable Building Operations, Automated Logic Corporation, 2013.
WebCTRL®—Powerful and Intuitive Front End for Building Control, Mar. 26, 2015.
Press Release, Helium Makes Sense of the Internet of Things, Oct. 27, 2015.
Press Release, Helium Introduces Another Smart Sensor for Environmental Monitoring, Apr. 25, 2016.
Press Release, Helium Announces Helium Pulse Monitoring and Alerting Application, Apr. 25, 2016.
EE Times, IoT Startup Revises 802.15.4 Nets, Oct. 27, 2015.
Helium Pulse™ for Monitoring and Alerting, 2016.
Helium Green™ Environmental Smart Sensor, 2016.
Helium Blue™ Temperature & Door Smart Sensor, 2016.
First Action Interview Pilot Program Pre-Interview Communication, U.S. Appl. No. 14/710,766, mailed Jun. 24, 2016.
First Action Interview Pilot Program Pre-Interview Communication, U.S. Appl. No. 14/945,506, mailed Mar. 3, 2017.
First Action Interview Pilot Program Pre-Interview Communication, U.S. Appl. No. 14/862,280, mailed Mar. 8, 2017.

* cited by examiner

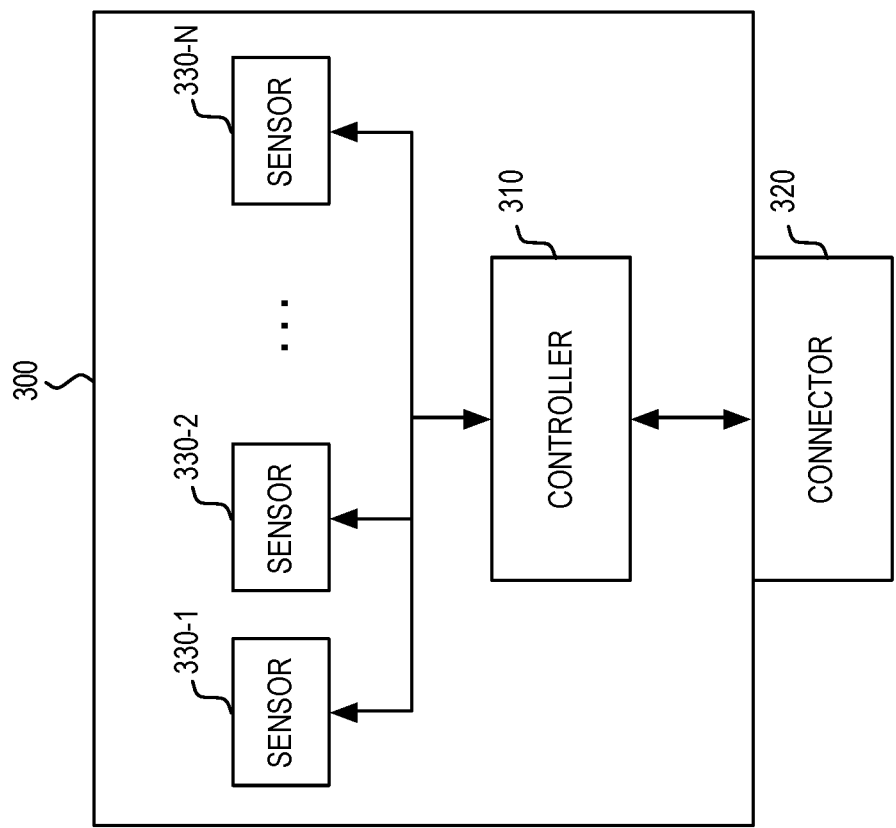

DEMAND/RESPONSE MECHANISM IN A WIRELESS SENSOR NETWORK

This application is a continuation of non-provisional application Ser. No. 14/710,766, filed May 13, 2015. Non-provisional application Ser. No. 14/710,766 claims the benefit of and priority to provisional application No. 61/992,307, filed May 13, 2014, and to provisional application No. 62/136,959, filed Mar. 23, 2015. Each of the above-identified applications is incorporated herein by reference in its entirety.

BACKGROUND

Field

The present disclosure relates generally to sensor applications, including a demand/response mechanism in a wireless sensor network.

Introduction

Sensors can be used to monitor physical or environmental conditions. Wireless sensor networks can be used to collect data from distributed sensors and to route the collected sensor data to a central location.

BRIEF DESCRIPTION OF THE DRAWINGS

In order to describe the manner in which the above-recited and other advantages and features can be obtained, a more particular description will be rendered by reference to specific embodiments thereof which are illustrated in the appended drawings. Understanding that these drawings depict only typical embodiments and are not therefore to be considered limiting of its scope, the disclosure describes and explains with additional specificity and detail through the use of the accompanying drawings in which:

FIG. 3 illustrates an example embodiment of a sensor module unit.

DETAILED DESCRIPTION

Various embodiments are discussed in detail below. While specific implementations are discussed, it should be understood that this is done for illustration purposes only. A person skilled in the relevant art will recognize that other components and configurations may be used without parting from the spirit and scope of the present disclosure.

Sensors provide a mechanism for discovering and analyzing the state of physical or environmental conditions. Wireless sensor networks provide an efficient mechanism for connecting with and retrieving sensor data from a distributed set of sensors. The growing emphasis on the Internet of Things (IoT) has further reinforced the importance of wireless networks in connecting a range of devices. Notwithstanding today's emphasis on connecting a variety of devices using wireless communication, it is recognized in the present disclosure that the penetration of wireless sensor networks into the marketplace is limited due to the high level of installation and maintenance costs.

By their very nature, sensors are designed to measure a particular physical or environmental condition. Sensors therefore represent a class of application-specific devices. Every sensor network installation can be designed with unique cost constraints, measurement objectives, site restrictions, or other application-specific requirements that can influence sensor network design. These application-specific qualities lead to significant challenges in identifying a scalable solution that can be applied across various industries and markets. For example, it is recognized that a scalable solution should be flexible in accommodating new types of sensor applications with little redesign or redeployment of a wireless sensor network. Such a scalable solution would significantly reduce installation and maintenance costs as new sensors and application features are rolled out across an already deployed sensor network infrastructure. It is recognized that sensor network solutions should enable an evolution of the deployed wireless sensor network without wasting previously-deployed wireless sensor network elements or requiring significant time or expense in modifying the previously-deployed wireless sensor network.

Figure 1:
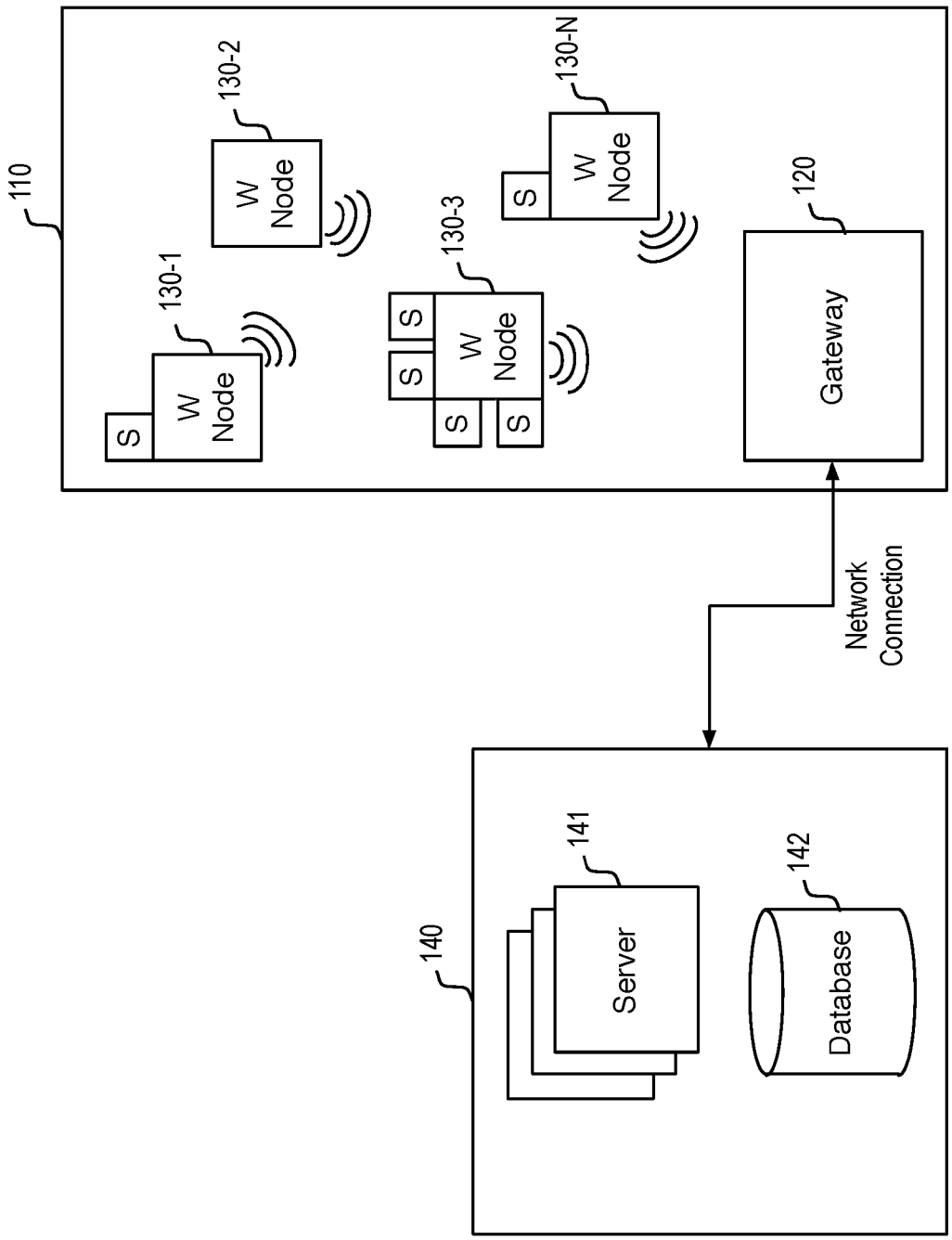
FIG. 1 illustrates an example embodiment of a wireless sensor network that can collect and distribute sensor information.

FIG. 1 illustrates an example embodiment of a wireless sensor network that can collect and distribute sensor information. The wireless sensor network can be configured to collect and distribute sensor information that is based on measurements by sensors deployed at monitored location 110. Monitored location 110 can represent any area where a collection of sensors is deployed. Monitored location 110 may or may not represent a physical area having clearly defined boundaries. As would be appreciated, the extent of the monitoring application itself provides a sense of boundary to monitored location 110. In one example, monitored location 110 can represent a building such as a home, hotel, school, community building, stadium, convention center, warehouse, office building, multi-dwelling unit, or other defined building structure. In another example, monitored location 110 can represent an area of control such as a monitored area that can be fixed or movable.

Disposed within monitored location 110 is a plurality of sensors. Communication between the plurality of sensors and gateway device 120 is facilitated by a set of wireless nodes 130-n. In general, wireless nodes 130-n can be configured to form a wireless mesh network. In one embodiment, the communication protocol between wireless nodes 130-n is based on the IEEE 802.15.4 protocol. A wireless mesh network can be formed between wireless nodes 130-n and can be used to facilitate communication between any wireless node 130-n and gateway device 120.

A wireless node 130-n can be configured to support one or more sensor module units (S), each of which can be individually coupled to a wireless node 130-n via a plug-and-play universal sensor interface. The plug-and-play universal sensor interface facilitates the separation of the wireless node communication infrastructure from the set of one or more sensor module units that are deployed at the location at which the supporting wireless node 130-n is installed. This separation creates significant flexibility in choice of sensors that may or may not be deployed proximate to the time of installation of the supporting wireless node 130-n.

As such, the plug-and-play universal sensor interface enables a sensor network solution to respond to changes in the sensor application requirements at monitored location 110 without incurring significant redeployment costs.

This flexibility would not be available if sensors were integrated with a wireless node. When a wireless node is deployed with integrated sensors, the monitoring capability of the wireless node is limited to the sensors that were pre-installed in the wireless node. This pre-installation would fix the capability of the wireless node at the time of deployment and would limit the wireless node to a static sensor application objective. Thus, if a defective sensor needs to be replaced, or if another type of sensor needs to be added to meet a dynamic sensor application objective, then the wireless node would need to be replaced or otherwise modified. This would impact at least part of the wireless sensor network infrastructure, which can result in sensor network downtime at the monitored location. A further impact would be produced as the maintenance expense of such a replacement or modification would be prohibitive.

In the present disclosure, the plug-and-play universal sensor interface enables the sensor module units to be deployed separately from wireless nodes 130-*n*. The plug-and-play universal sensor interface allows any type of sensor module unit to be connected to any wireless node 130-*n* at any time and without any reconfiguration of the supporting wireless network infrastructure. This feature allows great flexibility in the deployment and modification of wireless sensor networks at a lower price point. Additionally, the plug-and-play universal sensor interface enables the monitoring capabilities of the wireless sensor network to scale seamlessly with the dynamic nature of changing sensor application objectives.

In one example, a wireless node 130-*n* can be configured to support four sensor module units. As would be appreciated, the particular number of sensor module units that can be supported by a wireless node 130-*n* can vary. Sensor module units can be added onto wireless nodes 130-*n* sequentially at different deployment times. Thus, for example, a first sensor module unit can be added at a time of installation of the wireless node 130-*n*, with one or more additional sensor module units added to the same wireless node 130-*n* in the future as needed to address changing sensor application objectives.

In one embodiment, each of the sensor module units can support a plurality of individual sensors. In one example, a sensor module unit can support a set of eight sensors. In this example, the set of eight sensors can include sensors of one or more types. For example, sensors in a sensor module unit can include one or more of the following: a temperature sensor, a humidity sensor, an air quality sensor (e.g., $CO_2$ sensor), a light sensor, a sound sensor, a contact sensor, a pulse sensor, a water sensor, or any other type of sensor configured to measure a characteristic of a part of monitored location 110. A sensor module unit can include multiple sensors of a single type. For example, a particular configuration of a sensor module unit can include four pulse sensors, one temperature sensor, one humidity sensor, one air quality sensor, and one light sensor. In another example, a particular configuration of a sensor module unit can include eight sensors of a single type. As would be appreciated, the set of sensors included within a particular sensor module unit can be chosen to meet a given sensor application objective.

In the present disclosure, it is recognized that sensor module units can be targeted or otherwise designed for a particular class of sensor applications. For example, one sensor module unit can be designed for sensor applications targeted to school buildings, while another sensor module unit can be designed for sensor applications targeted to office buildings. The sensor module unit targeted for school building use can include a set of sensors that are popular with school building sensor applications. For instance, the set of sensors can include pulse sensors for measuring utility consumption (e.g., gas, water, electricity), a temperature sensor, an air quality sensor, a humidity sensor and a light sensor. The sensor module unit targeted for school building use can then be selected for installation with wireless nodes deployed in school buildings. In this manner, a relatively generic sensor module unit can be deployed across many sensor application deployments in various schools without requiring full customization for a specific application at a particular school. Production costs of the sensor module units are thereby minimized without any loss of flexibility in deploying customized sensor module units.

The impact on economies of scale can be readily appreciated. Wireless node modules can be produced on a larger manufacturing scale because the generic wireless nodes can be applied in many types of monitored locations in a manner that is separate from the particular sensor objectives at the particular monitored location. Correspondingly, a limited number of types of sensor module units can be manufactured. For example, a first sensor module unit type can be produced for office building applications and can include a suite of sensors typically used in office buildings. Similarly, a second sensor module unit type can be produced for school building applications and can include a suite of sensors typically used in school buildings.

In the deployment at a particular monitored location, the generic wireless nodes can be installed at the particular monitoring points in the monitored location with the particular type of sensor module unit attached to the generic wireless node to meet the particular needs at that monitoring point. Customization of this nature is far superior to the limited options presented by integrated devices. Customization need not result in wireless sensor network downtime and can be effected through the selective coupling of particular sensor module units to wireless nodes.

A further benefit of this form of customization is that it obviates the need to re-qualify and test wireless nodes to meet a new sensor application. Qualification need only be performed on new sensor module units since the existing wireless network infrastructure provided by the generic wireless nodes had previously been qualified and tested. This reduces the time needed to bring new sensor network features to market in addressing new market opportunities. If, on the other hand, sensors were integrated with the wireless nodes, then the entire device would need to be re-qualified and tested before being brought to market. As described, the plug-and-play universal sensor interface enables sensor network application customization without increasing installation and maintenance costs of the sensor network infrastructure.

Returning to FIG. 1, wireless node 130-1 is illustrated as supporting a single sensor module unit (S). Wireless node 130-2, on the other hand, is illustrated as not supporting any sensor module units. This example illustrates a scenario where wireless node 130-2 has been specifically installed as a wireless relay node in a wireless mesh network to facilitate a connection between wireless node 130-1 and gateway 120. As further illustrated, wireless node 130-3 supports four different sensor module units (S). This example illustrates a scenario where the sensing needs of a particular part of monitored location 110 is greater and would therefore require additional installed sensors at the location of wireless node 130-3. For instance, wireless node 130-3 can be installed in a hub of sensing activity at monitored location 110, while wireless node 130-1 or wireless node 130-N can be installed in a periphery of sensing activity at monitored location 110. The plug-and-play universal sensor interface enables sensor module unit deployment to match sensor application needs in a manner that scales seamlessly with the deployed wireless network infrastructure. Deployment and maintenance costs are thereby contained.

The wireless mesh network created by wireless nodes 130-*n* facilitates communication between sensor module units and gateway 120 via the wireless network infrastructure established by wireless nodes 130-*n*. Gateway 120 can be installed at monitored location 110 and can be provided with network connectivity. For example, gateway 120 can be provided with a network connection that facilitates communication of sensor data to host system 140. The network connection can be embodied in various forms depending upon the particular characteristics of monitored location 110.

For example, where monitored location 110 is a building in a developed area, then the network connection can be facilitated by a wired Internet connection via an Internet service provider. In another example, where monitored location 110 represents a remote physical area (or movable area) that may or may not include a building structure, then the network connection can be facilitated by a terrestrial or satellite based wireless network. As would be appreciated, the principles of the present disclosure would not be dependent on the particular form of network connection supported by gateway 120 in communicating with host system 140.

The network connection between gateway 120 and host system 140 enables the collection of sensor data by host system 140. In one embodiment, host system 140 can be located in a location remote from gateway 120. In general, host system 140 can be configured to perform a collection of sensor data from monitored location 110, storage of sensor data in database 142, and a distribution of sensor data to one or more destinations. As illustrated, host system 140 can include one or more servers 141 that can facilitate the collection, storage and distribution processes.

Figure 2:
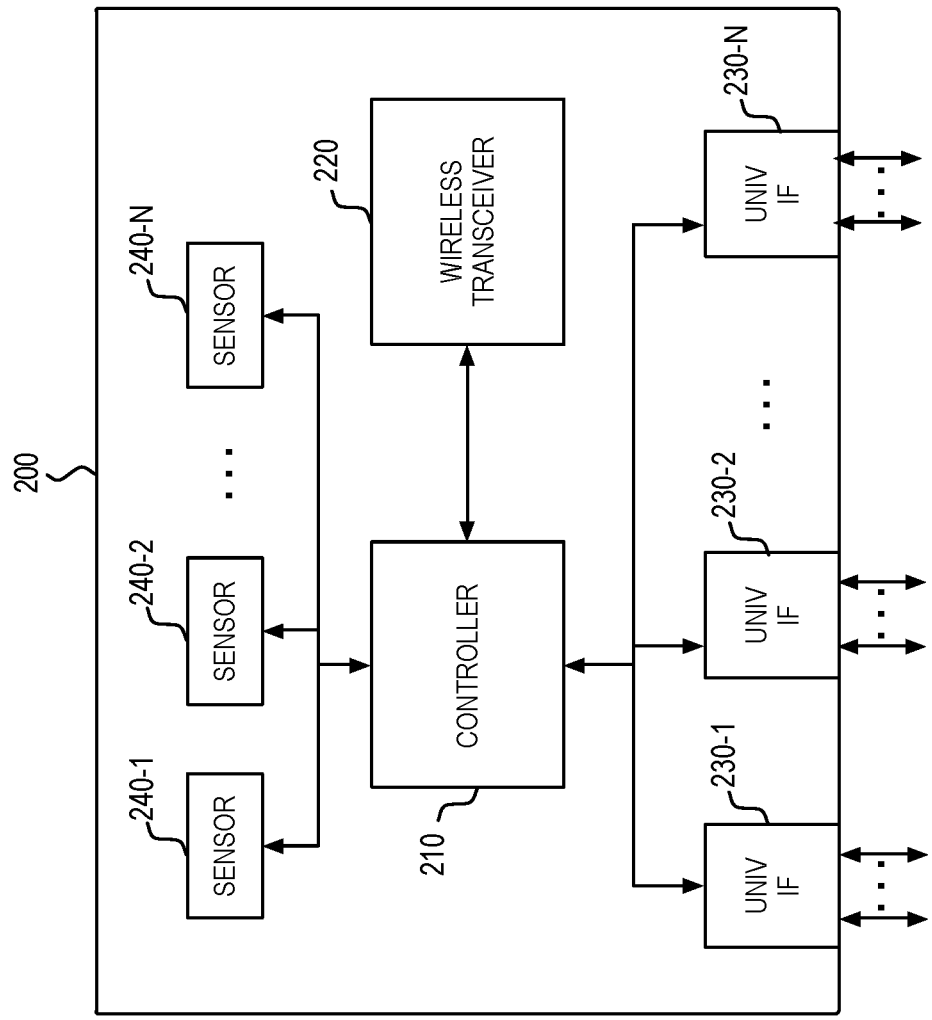
FIG. 2 illustrates an example embodiment of a wireless node.

As described, wireless nodes 130-*n* provide a wireless network infrastructure upon which sensor module units can be deployed for a customized sensor application. FIG. 2 illustrates an example embodiment of a wireless node. As illustrated, wireless node 200 includes controller 210 and wireless transceiver 220. In one embodiment, wireless node 200 can be powered via a battery source (not shown). In another embodiment, wireless node 200 can be powered via an external power source available at the point of installation at the monitored location.

Wireless transceiver 220 facilitates wireless communication between wireless node 200 and a gateway or another wireless node that operates as a relay between wireless node 200 and the gateway. The sensor data communicated by wireless transceiver 220 is collected by controller 210 via one or more universal sensor interfaces 230-*n*. Each universal sensor interface 230-*n* can support connection of wireless node 200 with a separate sensor module unit that can be attached to wireless node 200.

Universal sensor interfaces 230-*n* can represent a combination of hardware and software. The hardware portion of universal sensor interfaces 230-*n* can include a wired interface that enables communication of different signals between wireless node 200 and a connected sensor module unit. In one example, the wired interface can be enabled through a connector interface, which is exposed by the housing of the wireless node 200, and that is configured to receive a sensor module unit connector via removable, pluggable insertion.

In one embodiment, the wired interface can be based on a Serial Peripheral Interface (SPI) bus. In one example, the wired interface enables six connections: supply, ground, data in, data out, clock, and device select. The device select connection can be unique to each wired interface and can enable controller 210 in wireless node 200 to select the particular sensor module unit with which wireless node 200 desires to communicate. The software portion of the universal sensor interfaces 230-*n* can include a protocol that allows wireless node 200 to communicate with a sensor module unit.

In one example protocol, controller 210 can be configured to poll the various universal sensor interfaces 230-*n* to determine whether any sensor module units are connected. As part of this protocol, controller 210 can first request a sensor ID from a sensor module unit. If the response read is 0, then controller 210 would know that no sensor module unit is connected to that universal sensor interface 230-*n*. If, on the other hand, the response read is not 0, then controller 210 would ask for the number of data values that have to be retrieved and the number of bits on which the data values are coded. In one example, the higher order 8-bits of a 16-bit communication between controller 210 and a sensor module unit identifies the number of data values, while the lower order 8-bits of the 16-bit communication identifies the number of bits used to code each data value. Based on the number of data values to be retrieved, controller 210 would then collect that number of data values, wherein each value can represent a different sensor channel of the sensor module unit.

In one example, a wireless node can be configured for coupling to four different sensor module units. If each of the sensor module units can include up to eight sensors, then the wireless node can be configured to communicate 32 sensor channels of data to the gateway via wireless transceiver 220.

In the illustration of FIG. 2, wireless node 200 also includes one or more sensors 240-*n*. In one example, sensors 240-*n* can be contained within or otherwise supported by the housing of wireless node 200. In various scenarios, the one or more sensors 240-*n* can facilitate monitoring at that part of the monitored location, including the health and/or status of wireless node 200. In one example configuration, sensors 240-*n* can include a temperature sensor, a humidity sensor, a voltage sensor, a link quality sensor, or any other sensor that can be used to facilitate the sensing needs of wireless node 200.

As noted, wireless nodes can be designed as a generic communication node upon which customized sensing functionality can be added through the connection of particular sensor module units. In this framework, the wireless nodes can be constructed with base communication functionality that can operate independently of particular sensors. As such, the wireless nodes can provide a relatively stable wireless network infrastructure that can support multiple generations of sensor module units. As would be appreciated, the requirements of the sensor module units would be dependent on the particular sensing application. For example, a first sensor module unit can be designed with a first generation sensor having a first degree of accuracy, reliability, or other sensor characteristic, while a second sensor module unit can be designed with a second generation sensor of the same type having a second degree of accuracy, reliability, or other sensor characteristic. As this example illustrates, different generations of sensor module units can be attached to the same wireless node using the plug-and-play universal sensor interface. The original investment in the wireless node would not be lost should the second sensor module unit replace the originally-installed first sensor module unit. A low-cost evolutionary path of the wireless sensor network would therefore be enabled that could scale seamlessly with a customer's needs, sensor technology, or other factor that implicates a sensor module unit modification.

FIG. 3 illustrates an example embodiment of a sensor module unit designed for attachment to a wireless node. As illustrated, sensor module unit 300 includes controller 310 that communicates over a universal sensor interface with the wireless node. In one embodiment, sensor module unit 300 supports a connector 320 configured for pluggable, removable insertion into a connector interface exposed by the wireless node. In another embodiment, the sensor module unit can be coupled to the connector interface exposed by the wireless node via a connector attached to a cable.

Sensor module unit 300 can include a plurality of sensors 330-*n*. In one example, sensor module unit 300 includes up to eight sensors of one or more types. In the present disclosure, it is recognized that a sensor module unit can be pre-populated with a suite of sensors targeted to a particular class of sensor applications. In this framework, a first suite of sensors can be used in a first sensor module unit targeted to a first sensor application (e.g., school buildings), while a second suite of sensors can be used in a second sensor module unit targeted to a second sensor application (e.g., office buildings) different from the first sensor application. Here, the underlying wireless network infrastructure can remain the same while particular sensor module units are chosen for coupling to one or more wireless nodes to facilitate a particular sensor application at a monitored location.

Figure 4:
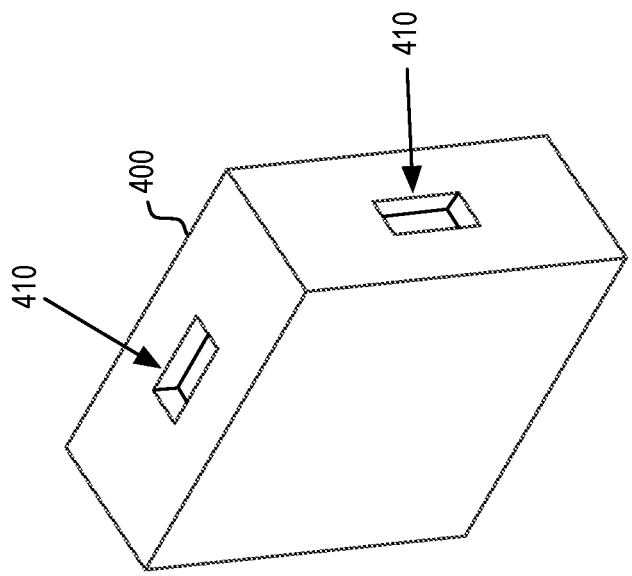
FIG. 4 illustrates an example embodiment of a housing of a wireless node that exposes connector interfaces.

The plug-and-play nature of the connection of sensor module units to supporting wireless nodes facilitates a modular framework of installation of a wireless sensor network. FIG. 4 illustrates an example embodiment of a housing of a wireless node that exposes a plurality of connector interfaces to produce the modular framework. As illustrated, wireless node 400 can have a housing configured to expose a plurality of connector interfaces 410. Each of the plurality of connector interfaces 410 can support the physical attachment of a single sensor module unit. In the example illustration, each side of the housing of wireless node 400 exposes a single connector interface 410. In the present disclosure, it is recognized that the housing of the wireless node can be substantially larger than the housing of the sensor module unit. This can result, for example, because the wireless node can be designed with additional components such as an internal power source (e.g., battery) that can involve additional volume requirements as compared to the sensor module units. It is therefore recognized that one embodiment of a wireless node can have multiple sensor module units physically attached to a single side of the wireless node.

Figure 5:
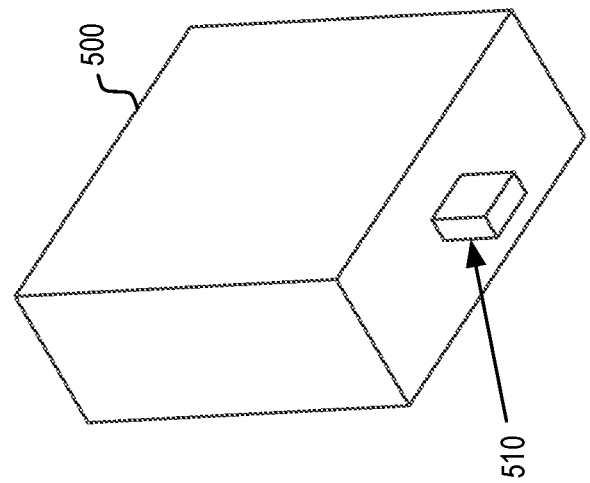
FIG. 5 illustrates an example embodiment of a housing of a sensor module unit.

FIG. 5 illustrates an example embodiment of a housing of a sensor module unit that enables the modular framework. As illustrated, sensor module unit 500 supports a connector 510 that can be configured for pluggable, removable insertion into a corresponding connector interface 410 exposed by the housing of wireless node 400. The connection of sensor module unit 500 to wireless node 400 via the insertion of connector 510 into connector interface 410 produces a true plug-and-play framework of wireless sensor network deployment.

Figure 6:
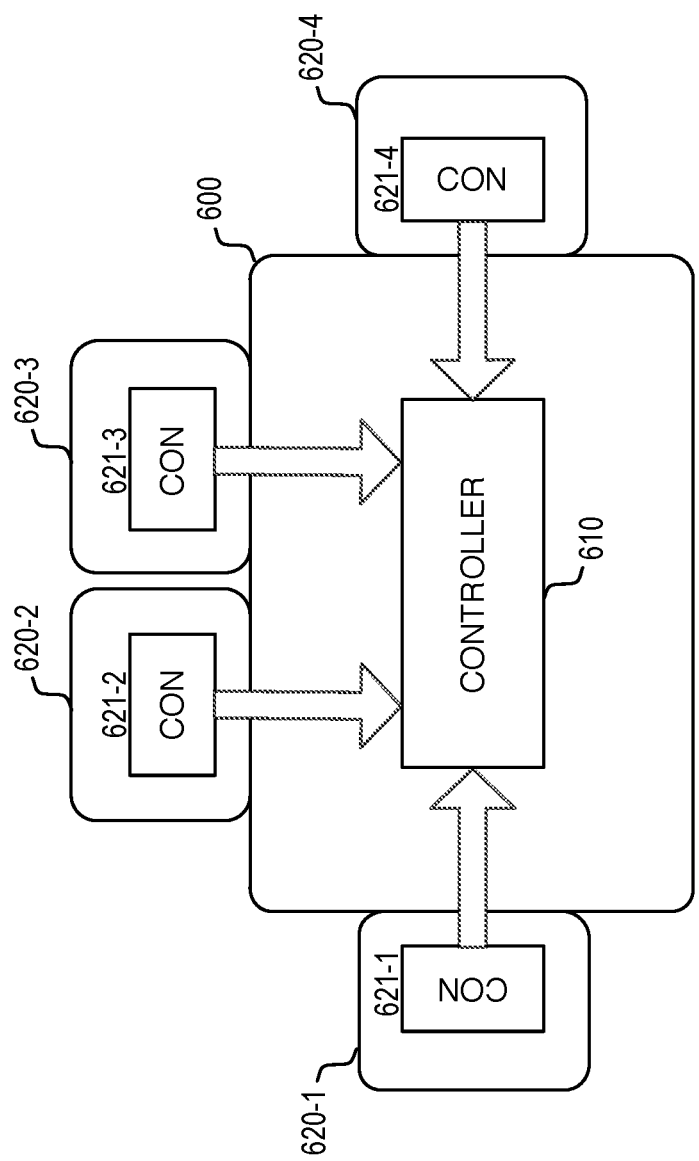
FIG. 6 illustrates an example embodiment of a wireless node that is physically attached to a plurality of sensor module units.

FIG. 6 illustrates an example embodiment of a wireless node that is physically attached to a plurality of sensor module units via universal sensor interfaces. As illustrated, wireless node 600 is attached to sensor module unit 620-1, sensor module unit 620-2, sensor module unit 620-3, and sensor module unit 620-4 via four connector interfaces exposed by the housing of wireless node 600. The attachment of sensor module unit 620-1 to wireless node 600 enables communication of sensor data between controller 621-1 and controller 610. The attachment of sensor module unit 620-2 to wireless node 600 enables communication of sensor data between controller 621-2 and controller 610. The attachment of sensor module unit 620-3 to wireless node 600 enables communication of sensor data between controller 621-3 and controller 610. Finally, the attachment of sensor module unit 620-4 to wireless node 600 enables communication of sensor data between controller 621-4 and controller 610. Each of sensor module units 620-1 to 620-4 can be coupled to wireless node 600 via a separate universal sensor interface having the connectivity characteristics described above.

Controller 610 in wireless node 600 can communicate with each of sensor module units 620-1 to 620-4 to retrieve sensor data generated by one or more sensors on the respective sensor module units 620-1 to 620-4. In one embodiment, the sensor channels of data that are communicated from sensor module unit 620-*n* to wireless node 600 are configurable. As noted, communication between controller 610 and the sensor module units 620-1 to 620-4 can be based on a protocol that enables identification of the number of data values that are transmitted from each of sensor module units 620-1 to 620-4 to controller 610. In one embodiment, a sensor module unit can be configured to transmit data from only a subset of the sensors on the sensor module unit. This selective transmission of sensor channels of data can support a billing model where customers pay per sensor channel stream of data that is exposed by the host system to the customer.

Figure 7:
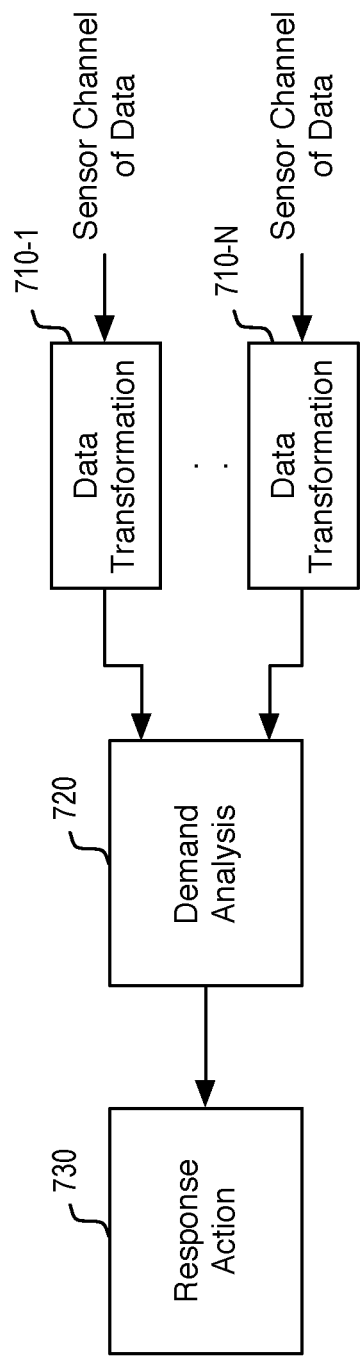
FIG. 7 illustrates an example embodiment of a pulse sensor.

In the present disclosure, it is recognized that customers can have unique interests in the sensor information generated based on measurements by sensors at a monitored location. In various embodiments, the sensor information can be used to analyze operational conditions at the monitored location to determine potential responses to such operational conditions. To illustrate this analysis process, reference is made to the data flow illustrated in FIG. 7.

As illustrated, the data flow begins with one or more individually identified sensor channels of data. In the illustrated example, a plurality of individual sensor channels of data have been identified as inputs into a customized demand-response process. Each individual sensor channel of data can be produced by a separate sensor. As a group, the plurality of individual sensor channels of data can originate from one or more sensor module units that are attached to one or more wireless nodes at one or more monitored locations.

In one example, each individual sensor channel of data can have a customized data transformation function defined for application to that sensor channel of data. As such, the customized data transformation function can be associated with an individual sensor channel of data. In one embodiment, a data transformation function is stored based on an identifier that includes a gateway identifier, a wireless node identifier, a port identifier and a sensor identifier. If a data transformation function has been defined, it can be applied to the raw sensor data to produce transformed sensor data. For example, data transformation function 710-1 can be applied to a first sensor channel of data while a different data transformation function 710-N can be applied to a separate sensor channel of data. Distinct data transformation functions can be defined separately for as many sensor channels of data that are included in a demand analysis.

Figure 8:
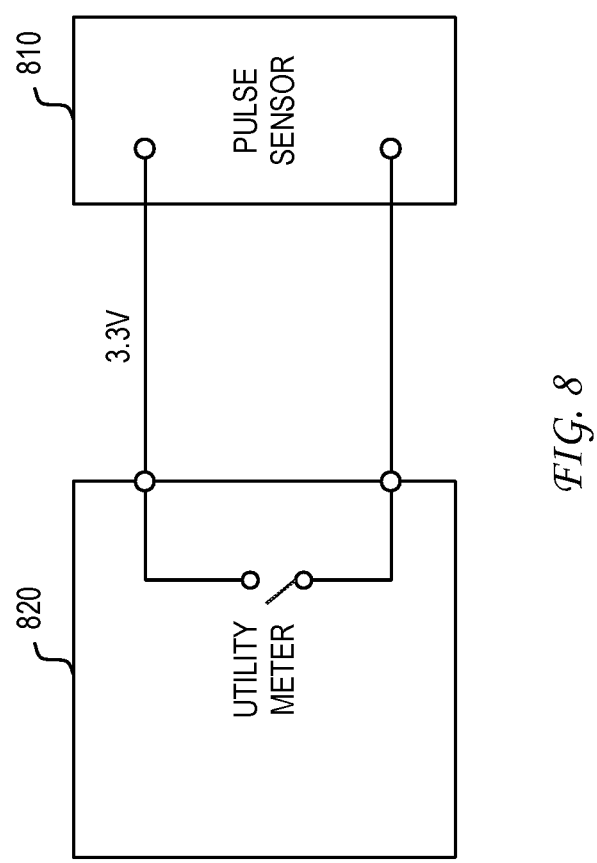
FIG. 8 illustrates an example embodiment of a data flow.

To illustrate the concept of a transformation function, consider the example of the pulse sensor illustrated in FIG. 8. As illustrated, pulse sensor 810 can be coupled to utility meter 820 via a pair of conductors. The actual wired interface between pulse sensor 810 and utility meter 820 can vary depending on the type of utility meter that is present. As illustrated, pulse sensor 810 can be configured to provide 3.3V on a first conductor. Utility meter 820 includes a dry contact relay that would successively relay the 3.3V provided by pulse sensor 810 and then open the relay. In one example, a first state of the relay can correspond to a first part of a disk rotation, while a second state of the relay can correspond to a second part of a disk rotation. Where the first state of the relay corresponds to a first half of the disk rotation and the second state of the relay corresponds to a second half of the disk rotation, then a full rotation of the disk would encounter two changes in state of the sensed value at pulse sensor 810. As would be appreciated, utility meters can be defined such that a different number of state changes in the relay can be produced for a single disk rotation. Thus, while pulse sensor 810 can measure the number of changes in the state of the relay at utility meter 820 over a period of time, pulse sensor 810 would not know how many disk rotations actually occurred at utility meter 820 in that period of time. Without knowledge of the number of disk rotations that actually occurred at utility meter 820, information about the amount of a utility service consumed would not be available.

The same pulse sensor can be used to measure relay transitions in many different types of utility meters having different rates of correspondence between relay transitions and disk rotations. In converting the measured number of relay transitions into useful information, a transformation function can be defined to perform the conversion of raw sensor data into sensor information. Consider a simple example of a utility meter that has four relay transitions per disk rotation. In this example, a first transformation function (divide by four) can be a defined such that the number of detected relay state transitions by the pulse sensor is divided by four to produce a corresponding number of disk rotations. The number of disk rotations could then be converted by a second transformation function into an actual consumption quantity of the utility measured by the utility meter. As would be appreciated, the combination of the first and second transformation function can be defined to match the particular characteristics of the utility meter being monitored to produce useful sensor information.

Data transformation functions may or may not be defined for particular sensor channels of data. Referring back to FIG. 7, demand analysis 720 can be configured to receive inputs based on one or more sensor channels of data whether or not data transformation functions have been defined for all or part of the sensor channels of data. If a single input based on one sensor channel of data is used, then demand analysis 720 can be relatively simple. In the simplest example, the transformed data produced from a pulse sensor can represent the demand of a consumable utility. Demand analysis 720 could then implement one or more threshold values for comparison to the demand to determine whether a response action should be taken.

In more complex examples, demand analysis 720 can be configured to receive a plurality of inputs based on a corresponding plurality of sensor channels of data. As would be appreciated, the inputs can represent any combination of raw and transformed data values. Demand analysis 720 can analyze the plurality of inputs in a variety of ways. In one example, a demand value can be produced through a defined demand estimation function such as fxn(sensor1, sensor2, . . . sensorN). In another example, a demand analysis can represent a combinatorial analysis of multiple input values. Here, a conditional analysis of multiple independent demand components (e.g., (sensor1>X1 AND sensor2>X2) OR sensor3<X3)) can be performed to estimate a demand. As would be appreciated, a demand analysis based on a plurality of sensor channels of data can be defined to infer a particular change in demand at a monitored location as reflected by the multiple sensor channels of data.

Figure 9:
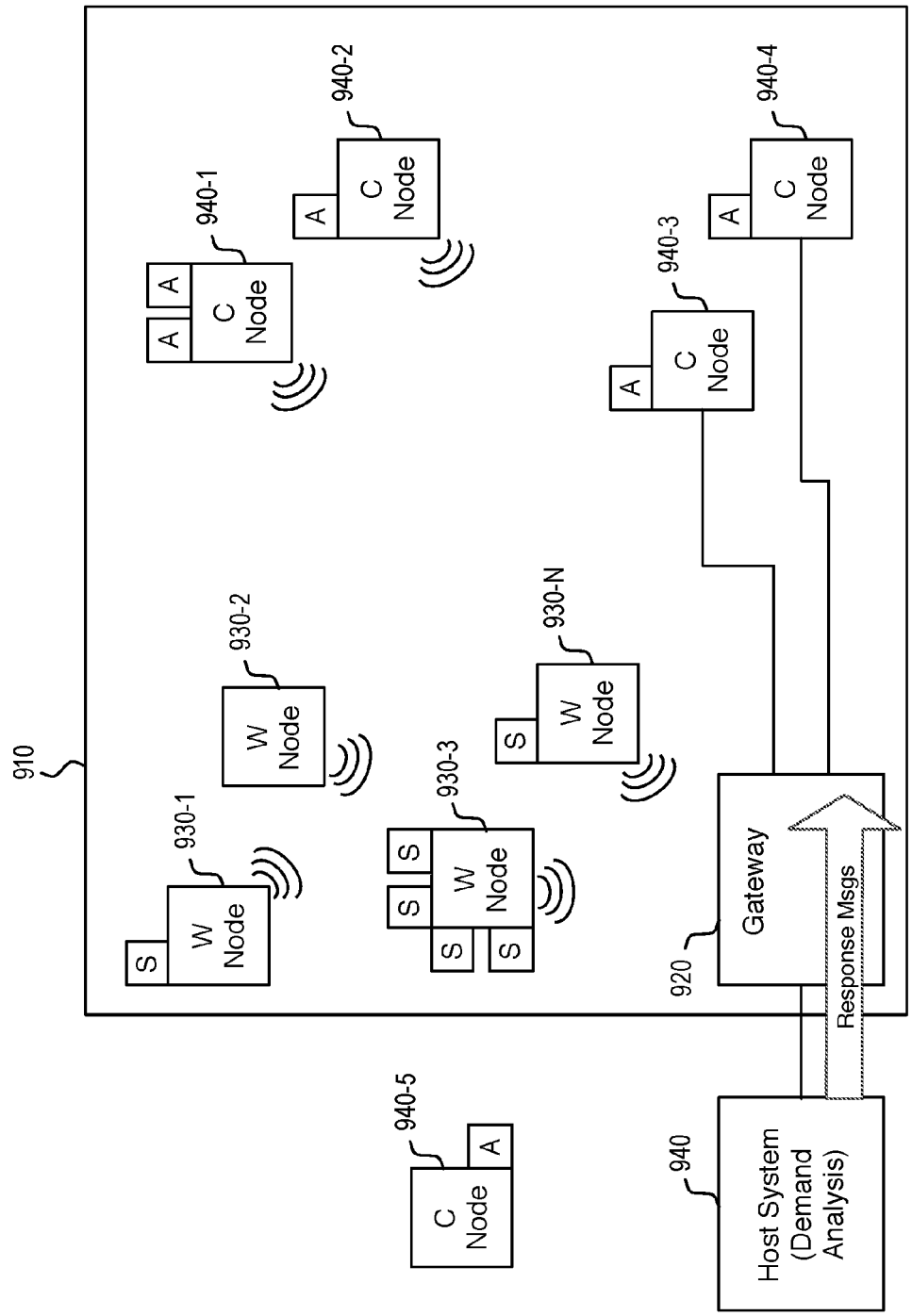
FIG. 9 illustrates an example embodiment of a demand/response system.

Demand analysis 720 can be configured to produce a response trigger. In one embodiment, this response trigger can be used to effect response action 730 at the monitored location. To illustrate the concept of a response action, reference is now made to FIG. 9, which illustrates a demand/response system.

As illustrated, a wireless sensor network, including sensor module units, wireless nodes 930-$n$ and gateway 920, can be configured to collect and distribute sensor information in a manner similar to that described in FIG. 1. The collected sensor channels of data can be forwarded by gateway 920 to host system 940, which can operate in an analysis mode to process the collected sensor channels of data to generate a demand analysis for certain resources within monitored location 910.

This demand analysis can be used by host system 940 to generate one or more response messages that are transmitted to one or more control nodes 940-$n$ installed at monitored location 910. As illustrated, control nodes 940-$n$ can be connected to gateway 920 either through wired or wireless connections. Each control node 940-$n$ can have one or more actuators (A) that can be used to effect a response action at monitored location 910. In one example, the wireless control nodes such as 940-1 and 940-2 can be similar to wireless nodes 930-$n$. In this framework, wireless control nodes 940-1, 940-2 can also include a universal interface that enables attachment of one or more actuator module units. In one embodiment, the actuators could be integrated with the wireless control node. In one embodiment, a wireless control node can represent a wireless node to which a sensor module unit and/or an actuator module unit is attached.

The actuator module units can be configured to effect various types of response actions at monitored location 910. As such, the plug-and-play nature of actuator module units would provide significant flexibility in configuring and/or re-configuring the response actions that are desired to be effected at monitored location 910. The particular types of response actions that can be effected would be implementation dependent. To illustrate a range of the types of response actions that can be effected by the actuators, consider the following demand/response system examples.

In one example, the demand/response model can be designed to effect a feedback loop to control resource consumption at monitored location 910. In this scenario, the collection of sensor channel(s) of data can be designed to enable an estimate of demand for a particular resource (e.g., water, electricity or gas consumption) at monitored location 910. Based on the demand analysis, host system 940 can then generate response message(s) that are configured to adjust future consumption of the particular resource at monitored location 910. In a simple example, the response message(s) can be designed to instruct an actuator to initiate the display of a visual alert to personnel at monitored location 910 that the consumption of the particular resource is exceeding a threshold. Here, the visual alert can be provided by the actuator itself, or by another device coupled to the actuator. In another example, the response message(s) can be designed to instruct an actuator to transmit a control signal to a device to alter consumption of the particular resource. In one scenario, the actuator control signal can shut down or otherwise limit the operation (e.g., reduce light output) of a device that consumes the particular resource. In yet another example, the response message(s) can be designed to instruct an actuator to transmit a control signal to a device that governs the supply of the particular resource to monitored location 910. In one scenario, the control signal can lower the maximum rate at which the particular resource can be supplied to monitored location 910.

In another example, the demand/response model can be designed to maintain a desired status at monitored location 910. In this scenario, the sensor channel(s) of data can be designed to enable determination of the current state of a measureable quantity at monitored location 910. In one example, the measurable quantity can represent a temperature of a room or area, a supply level of a resource, a fullness of a storage or inventory area, an efficiency of operation of one or more components, a level of activity or traffic, or any other quantity having a level or target that is desired. In this scenario, the sensor channel(s) of data can be used to determine the current state of the measurable quantity. If the demand analysis indicates that the current state of the measurable quantity has hit a level of variance relative to a target level, wherein the level of variance is beyond a threshold variance, then host system 940 can generate one or more response messages that can instruct one or more actuators at monitored location 910 to transmit a control signal that is operative to reduce the variance in the measurable quantity.

For example, there may exist an area at monitored location 910 that desires the temperature and/or humidity to be maintained at a certain level (e.g., refrigerated area, server room, surgical room, or other temperature and/or humidity sensitive environment). When the analysis of sensor channel(s) of data indicate that the current temperature and/or humidity has deviated too much from a target level, then one or more response messages can be produced to instruct an actuator to generate a control signal to adjust the operation of an HVAC system that governs the particular area of monitored location 910 or adjust a level of operation of one or more components that impacts the temperature and/or humidity at that particular area of monitored location 910. For example, a control signal can be used to modify the operation of a heat-generating component.

In another example, sensor channel(s) of data can be used to detect sub-optimal operation of one or more components at monitored location 910. In one scenario, temperature sensor readings can be used to measure how well a current chiller (e.g., machine that cools air, a substance or equipment) is working and to generate a control signal that can be used to signal the need for repair or for a new chiller to be obtained. For example, the control signal can be used to provide contact information for a repair technician or sales representative. In another scenario, sensor channel(s) of data that are indicative of power consumption relative to efficiency of operation can be used to signal the need for repair or for a new unit to be obtained. In effect, the analysis of sensor channel(s) of data can be used to produce sales opportunities at monitored location 910.

More generally, sensor channel(s) of data can be used to detect malfunctions in equipment where a deviation from an expected level of operation is detected through analysis. For example, a sump pump sensor can be used to detect when a sump pump is not working, or working inefficiently. One or more response messages can then be produced to instruct an actuator to generate a control signal to alert relevant personnel at monitored location 910. In another example, sensor channel(s) of data can be used to detect water leaks (e.g., water sensor) and for generating one or more response messages that can be used by an actuator to generate a control signal to alert relevant personnel at monitored location 910 in a timely manner.

In another example, the demand/response model can be designed to discover and release unused resources at monitored location 910. In this scenario, sensor channel(s) of data can be designed to effect a determination of the current usage of resources at monitored location 910. In this context, the resources can represent temporary or shared offices, conference rooms, common areas, storage facilities, or other physical resources at monitored location 1610 that can be re-purposed or otherwise leveraged in a new capacity. In one example, sensor channel(s) of data can be used to determine the current usage of a defined physical space by individuals, inanimate objects, or other items that have usage characteristics. If the demand analysis indicates that the defined physical space is unused or used at a level below a threshold amount, then host system 940 can generate one or more response messages that can instruct actuators at monitored location 910 to transmit a control signal that is used to signal the availability of at least part of the defined physical space. One application of such a demand/response model is to enable workplace reservation optimization such that reserved resources (e.g., conference rooms) are released when the sensor channel(s) of data (e.g., light and sound) indicate that the reserved resource is not being used. When sensor channel(s) of data indicate that the reserved resource is not being used, then one or more response messages can be used (e.g., message to a resource manager, receptionist, or other party responsible for overseeing use of the reserved resource) to release the reservation or otherwise indicate the current availability of a previously-reserved resource.

In a related application, the demand/response model can be used to determine and signal when resources can be used. For example, sensor channel(s) of data can be used to detect harmful conditions that preclude the occurrence of organized activities. For example, wet bulb globe temperature (WBGT) sensor readings, which represent a composite temperature used to estimate the effect of temperature, humidity, wind speed (wind chill), and visible and infrared radiation (usually sunlight) on humans, can be used to detect whether organized outdoor activities should be held in a school, a military base, or other organization hosting an outdoor event. In a simple example, host system 940 can generate one or more response messages that can instruct actuators at monitored location 910 to transmit a first control signal that is used to indicate that an organized activity can be held (e.g., green light), a second control signal that is used to indicate than an organized activity cannot be held (e.g., red light), or another control signal that is used to indicate one or more restrictions for an organized activity (e.g., warning lights and instructions).

As has been described, the demand/response model can represent a scenario where the demand analysis performed on sensor channel(s) of data is used to initiate one or more response actions by one or more actuators at monitored location 910. The exact form of the response action and the control signal mechanism used by the actuator that effects the response action can vary based on the resource application.

In various contexts, it is recognized that an initial response message can be transmitted, via wired or wireless communication, to control node 940-5 that is outside monitored location 910. In this example, control node 940-5 would act as a type of relay in generating a second response message, based on the initial response message, that is transmitted to an actuator in monitored location 910.

Another embodiment of the present disclosure can provide a machine and/or computer readable storage and/or medium, having stored thereon, a machine code and/or a computer program having at least one code section executable by a machine and/or a computer, thereby causing the machine and/or computer to perform the steps as described herein.

Those of skill in the relevant art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Those of skill in the relevant art can implement the described functionality in varying ways for each particular application. Various components and blocks may be arranged differently (e.g., arranged in a different order, or partitioned in a different way) all without departing from the scope of the subject technology.

These and other aspects of the present disclosure will become apparent to those skilled in the relevant art by a review of the preceding detailed disclosure. Although a number of salient features of the present disclosure have been described above, the principles in the present disclosure are capable of other embodiments and of being practiced and carried out in various ways that would be apparent to one of skill in the relevant art after reading the present disclosure, therefore the above disclosure should not be considered to be exclusive of these other embodiments. Also, it is to be understood that the phraseology and terminology employed herein are for the purposes of description and should not be regarded as limiting.

What is claimed is:

1. A system, comprising:
    a gateway device installed at a building;
    a plurality of wireless node devices installed in a plurality of rooms in the building, a first of the plurality of wireless node devices installed in a first of the plurality of rooms in the building, the first of the plurality of wireless node devices receiving sensor data for wireless delivery to the gateway device for forwarding to a location remote from the building, the $CO_2$ sensor data based on measurements by a $CO_2$ sensor in the first of the plurality of rooms in the building; and
    a host system at the location remote from the building, the host system receiving the $CO_2$ sensor data from the gateway device, performing an assessment using the received $CO_2$ sensor data of an air quality level of the first of the plurality of rooms in the building due to occupancy of the first of the plurality of rooms to determine whether the air quality level of the first of the plurality of rooms has hit a level of variance relative to a target air quality level during a time period covered by a reservation of the first of the plurality of rooms, the host system transmitting, in response to the assessment, one or more response messages to the gateway device for wireless delivery to a second of the plurality of wireless node devices, wherein the one or more response messages enable the second of the plurality of wireless node devices to generate a control signal that is transmitted to an HVAC system component used to govern the air quality level of the first of the plurality of rooms, the HVAC system component using the received control signal to adjust the air quality level in the first of the plurality of rooms during at least part of the time period covered by the reservation.

2. The system of claim 1, wherein the first of the plurality of wireless node devices includes a wireless node physically attached to a sensor module containing the $CO_2$ sensor.

3. The system of claim 1, wherein the first of the plurality of wireless node devices also collects sound sensor measurements.

4. The system of claim 1, wherein the first of the plurality of wireless node devices also collects light sensor measurements.

5. A method, comprising:
    receiving, by a host system at a location remote from a building, $CO_2$ sensor data from a gateway device installed at the building, the $CO_2$ sensor data based on measurements by a $CO_2$ sensor in a first of a plurality of wireless node devices installed in a first of a plurality of rooms at the building, the first of the plurality of wireless node devices delivering the $CO_2$ sensor data to the gateway device via wireless communication;
    performing, by the host system using the received $CO_2$ sensor data, an assessment of an air quality level of the first of the plurality of rooms due to occupancy of the first of the plurality of rooms to determine whether the air quality level of the first of the plurality of rooms has hit a level of variance relative to a target air quality level during a time period covered by a reservation of the first of the plurality of rooms; and
    transmitting, by the host system in response to the assessment, one or more response messages to the gateway device for wireless delivery to a second of the plurality of wireless node devices, wherein the one or more response messages enable the second of the plurality of wireless node devices to generate a control signal that is transmitted to an HVAC system component used to govern the air quality level of the first of the plurality of rooms, the HVAC system component using the received control signal to adjust the air quality level in the first of the plurality of rooms during at least part of the time period covered by the reservation.

6. The method of claim 5, wherein the first of the plurality of wireless node devices includes a wireless node physically attached to a sensor module containing the $CO_2$ sensor.

7. The method of claim 5, further comprising receiving, by the host system sound sensor measurements collected by the first of the plurality of wireless node devices.

8. The method of claim 5, further comprising receiving, by the host system, light sensor measurements collected by the first of the plurality of wireless node devices.

9. The system of claim 1, wherein the first of the plurality of wireless nodes also collects temperature sensor measurements.

10. The system of claim 1, wherein the first of the plurality of wireless node devices also collects humidity sensor measurements.

11. The system of claim 1, wherein the second of the plurality of wireless node devices includes a wireless node physically attached to an actuator module containing an actuator.

12. The method of claim 5, further comprising receiving, by the host system, temperature sensor measurements collected by the first of the plurality of wireless node devices.

13. The method of claim 5, further comprising receiving, by the host system, humidity sensor measurements collected by the first of the plurality of wireless node devices.

14. The method of claim 5, wherein the second of the plurality of wireless node devices includes a wireless node physically attached to an actuator module containing an actuator.

* * * * *